(12) United States Patent
Reddy et al.

(10) Patent No.: US 11,176,088 B2
(45) Date of Patent: Nov. 16, 2021

(54) DYNAMIC SERVER POOL DATA SEGMENTATION USING DYNAMIC ORDINAL PARTITION KEY WITHOUT LOCKS

(71) Applicant: Bank of America Corporation, Charlotte, NC (US)

(72) Inventors: Netla Hanumantha Reddy, Hyderabad (IN); Venugopala Rao Randhi, Hyderabad (IN); Vijaya Kumar Vegulla, Hyderabad (IN); Rama Venkata S. Kavali, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/985,326

(22) Filed: Aug. 5, 2020

(65) Prior Publication Data

US 2020/0371991 A1  Nov. 26, 2020

Related U.S. Application Data

(63) Continuation of application No. 16/361,359, filed on Mar. 22, 2019, now Pat. No. 10,817,466.

(51) Int. Cl.
*G06F 11/14* (2006.01)
*G06F 16/11* (2019.01)
*G06F 16/16* (2019.01)
*G06F 16/13* (2019.01)

(52) U.S. Cl.
CPC .......... *G06F 16/119* (2019.01); *G06F 16/134* (2019.01); *G06F 16/16* (2019.01); *G06F 11/1456* (2013.01)

(58) Field of Classification Search
None
See application file for complete search history.

(56) References Cited

U.S. PATENT DOCUMENTS

| | | | |
|---|---|---|---|
| 6,240,428 B1 | 5/2001 | Yeung et al. | |
| 7,047,250 B1 | 5/2006 | Agarwal et al. | |
| 7,870,174 B2 | 1/2011 | Eadon et al. | |
| 8,200,705 B2 | 6/2012 | Wang et al. | |
| 8,464,214 B2 | 6/2013 | Miloushev et al. | |
| 10,108,669 B1 | 10/2018 | Krishnamoorthy et al. | |
| 2007/0226274 A1* | 9/2007 | Nishino | G06F 16/284 |

(Continued)

*Primary Examiner* — Brian R Peugh
(74) *Attorney, Agent, or Firm* — Banner & Witcoff, Ltd.; Michael A. Springs

(57) ABSTRACT

Aspects described herein may relate to a data processing engine that executes on a computing device in order to store data from one or more feed files, which may be heterogeneous, to a destination data structure on a designated computing device. Because the files may be huge in size, it is important that the files be stored in a manner in order to reduce the time to move the data and to support an efficient mechanism for recovering from errors. A feed file may be dynamically partitioned into groups of contiguous rows based on a dynamic partitioning key, where data chunks are loaded into a plurality of clone tables and subsequently moved into a destination data structure. The data processing engine may determine a row size for the clone files and request for resources from a computing cloud to obtain those resources.

20 Claims, 8 Drawing Sheets

(56) References Cited

U.S. PATENT DOCUMENTS

| | | | |
|---|---|---|---|
| 2015/0135327 A1* | 5/2015 | Wall | G06F 21/6218 |
| | | | 726/26 |
| 2015/0227521 A1* | 8/2015 | Levari | G06F 16/278 |
| | | | 707/694 |
| 2016/0275116 A1 | 9/2016 | Shi et al. | |
| 2017/0177633 A1* | 6/2017 | Wenzler | G06F 16/2237 |
| 2018/0285376 A1 | 10/2018 | Duan et al. | |

* cited by examiner

DYNAMIC SERVER POOL DATA SEGMENTATION USING DYNAMIC ORDINAL PARTITION KEY WITHOUT LOCKS

CROSS-REFERENCE TO RELATED APPLICATIONS

This application claims the benefit of and is a continuation of U.S. patent application Ser. No. 16/361,359, now U.S. Pat. No. 10,817,466 filed Mar. 22, 2019, and entitled "Dynamic Server Pool Data Segmentation Using Dynamic Ordinal Partition Key Without Locks." The foregoing application is incorporated by reference herein in its entirety.

TECHNICAL FIELD

One or more aspects of the disclosure generally relate to computing devices, computing systems, and computer software. In particular, one or more aspects of the disclosure generally relate to computing devices, computing systems, and computer software that may be used to store data from heterogeneous files to a designated data structure such as a database in a stipulated time over a data network.

BACKGROUND

Routine data processing often involving storing a large amount of data (for example, 500+GB) from heterogeneous files to a database (for example, RDBMS) in a stipulated time across network. Reading the data incrementally often takes a substantial amount of time to process huge files, for example, 20 hours in a day.

Due to huge processing times, there may be a failure (for example, device hardware, software, network connectivity, and so forth), requiring a re-run of the process. This may result in service level agreement (SLA) misses and consequently a detrimental impact to a business.

If the re-run does not happen from point of failure, the complete process may have to be executed from the start, consequently leading to huge lag in meeting the SLA with a limited guarantee that the process will not fail again.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects described herein may relate to a computing system that stores data from heterogeneous files to a destination data structure such as a database. With some embodiments, the computing system comprises a data source, primary server, destination server, and server pool (that may reside in the computing cloud). The data source may span one or more servers that are the source for one or more feed files. A data processing engine, which may be supported by the primary server, determines parameters for storing data in the destination data structure and requests a necessary amount of cloud resources (for example, a number of servers in a server pool).

With an aspect of the embodiments, a data processing engine at the primary server determines an optimal data set size of each source file to optimize the time for each feed file to read and load into a destination database in parallel by considering server resources, file size and columns, and data types in a table.

With an aspect of the embodiments, a data processing engine asynchronously loads data in parallel without sequence/locks on clone tables with a loosely coupled dynamic partition on a pool of servers. The engine creates a plurality of clone tables with a dynamic clone tables custom ordinal key to eliminate data redundancy and overhead of locks on the tables while data is loaded in parallel on the destination server. Each available server from the server pool loads the data into an associated empty clone table. Subsequently, all compressed clone tables data are switched into respective destination tables. The engine reduces CPU cycle, RAM, and I/O requirements due to loading optimal data chunks.

With an aspect of the embodiments, clone tables are created on different physical drives. An asynchronous parallel execution engine selects clone tables based on the physical drive usage, while loading data in parallel to avoid I/O bottlenecks.

With an aspect of the embodiments, a data processing engine requests a server pool for available resources before data movement. The engine may dynamically add or remove resources using a computing cloud infrastructure (for example, adding RAM, I/O, disk drives (HDD), servers, and so forth).

With an aspect of the embodiments, a data processing engine saves time with pool of servers. Data is loaded in parallel in small chunks by using limited CPU, RAM and network resources by each server in the server pool. Any failure of data movement may not require as much time to reload a corresponding data chunk compared to loading the entire amount. This approach provides more transparency in the server utilization from the server pool (for example, downstream dependent application servers may be utilized by a respective upstream application for processing). Moreover, data compression typically saves memory space on servers.

With an aspect of the embodiments, data is not saved in a pool of servers except at a master/primary server. This approach provides a greater degree of security.

With an aspect of the embodiments, if any data chunk fails to load due to data issues, a data processing engine may request for a corrective data chunk from a stakeholder for corrective action. The engine may load the data with a different server if there is any server issues.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Data processing tasks often entail storing more than 500 GB of data from a plurality of files (feed files), which may be heterogeneous files, to one or more destination files (for example, databases) in a stipulated time across a data network. Reading the data incrementally requires a substantial amount of time to process huge files (for example, 20 hours in a day).

Due to huge processing times there can be failure. With traditional approaches, this may require repeating (re-running) the loading of data and consequently results in service level agreement (SLA) misses. If the re-run does not happen from point of failure, the complete process may have to be executed from the start leading to huge lag in meeting the SLA with a limited guarantee that the process will not fail again. Embodiments in the disclosure may support a number of deficiencies with respect to traditional approaches.

With an aspect of the embodiments, a process determines an optimal data set for each feed file based on historical data, where data chunks are loaded in clone tables in parallel. The size of a data set (for example, the number of rows and/or bytes that may be designated as a row/byte count) may be computed using a deterministic regression algorithm. A data processing engine may recalibrate the optimal data set when the changes are made to the feed file columns or any resources (software/hardware).

With an aspect of the embodiments, there is a pool of servers that is tasked with reading the data from the feed file and copying the data at the destination server. The workload of the pool servers may be managed by one of the servers acting as a master/primary server. The pool of servers may be allocated in a computing cloud (sometimes referred as "the cloud"). If large amount of data is expected to load, a data processing engine may request for extra resources from the computing cloud.

Figure 1:
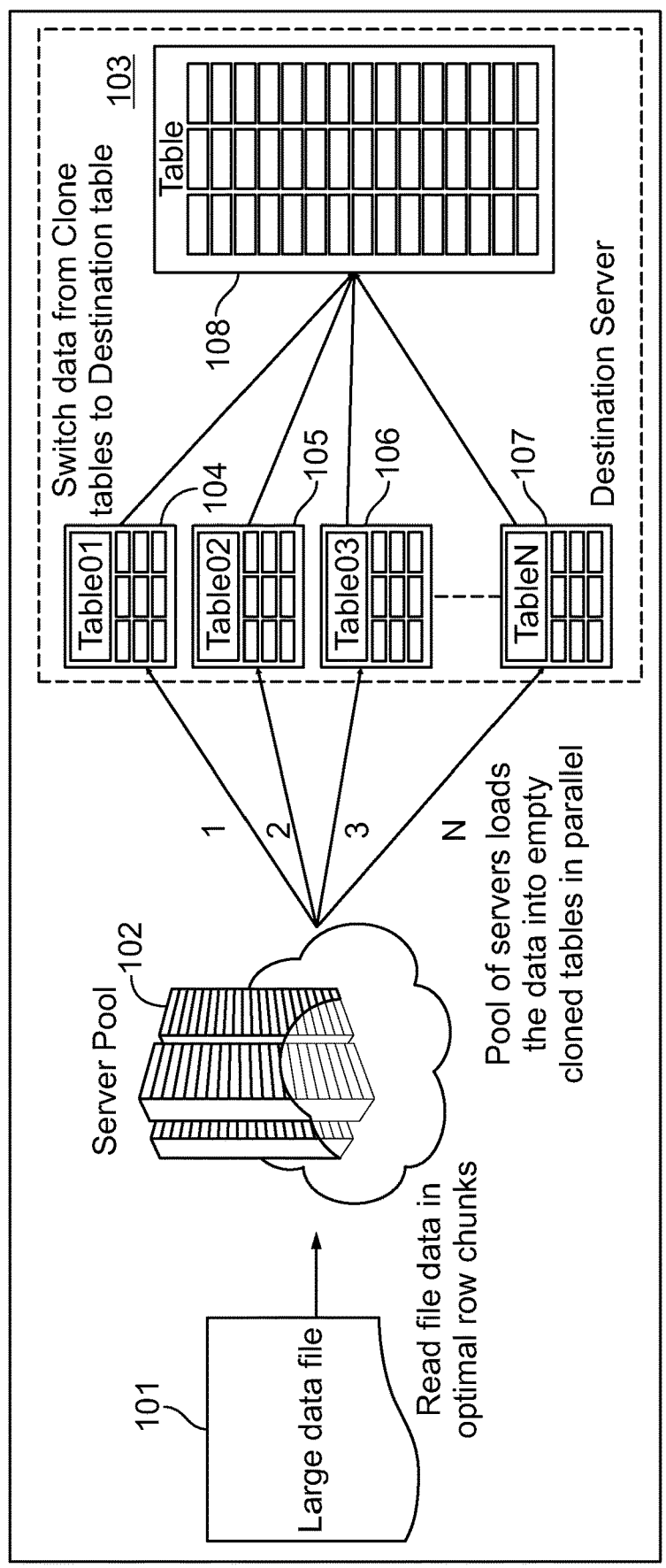
FIG. 1 illustrates a pool of servers loading data in parallel into clone tables at a destination server in accordance with one or more example embodiments.

FIG. 1 illustrates a pool of servers 102 loading data partitions (for example, from a large feed file 101) in parallel (concurrently) into clone tables 104-107 at destination server 103 in accordance with one or more example embodiments.

With an aspect of the embodiments, a data processing engine (which may be supported at a primary server not explicitly shown in FIG. 1) determines an appropriate dataset (that may have an optimal size) based on historical information for previously loaded feed file. The data processing engine may recalibrate the data set when the changes are made to the feed file columns or any resources (software/hardware).

Based on a request from the data processing engine, server pool 102 is tasked with reading the data from feed file 101 that is loaded to clone tables 104-107 and subsequently copied to destination table (file) 108 at destination server 103. The workload of servers in pool 102 may be managed by one of the servers acting as a master/primary.

With an aspect of the embodiments, a data processing engine, which may execute on the master/primary server, determines the optimal data set size resulting in an optimal time for concurrently loading a data partition (data chunk) into each clone table 104-107. The determination may be based on server resources, file size and columns, and data types.

With an aspect of the embodiments, data chunks are asynchronously loaded in parallel without sequence/locks on clone tables 104-107 with a loosely coupled dynamic partition on server pool 102. Loading data from large file 101 into table 108 may require a substantial amount of time (sometimes days) due to relational database management system (RDBMS) ACID rules and locks on table and hardware constraints. A data processing engine creates N clone tables with a dynamic clone tables custom ordinal key to eliminate the data redundancy and overhead of locks on the tables while data is loaded in parallel on destination server 103. Each available sever from server pool 102, loads the data into empty clone tables 104-107. Subsequently, compressed data from clone tables 104-107 is switched into destination table 108. This approach typically uses a reduced amount of CPU cycles, RAM and I/O due to optimal data chunks.

Embodiments may support concurrently loading a plurality of feed files. In such a situation, a separate set of clone tables may support the processing of each feed file. Each feed file may then be switched into a separate destination file or may be merged into a common destination file.

With an aspect of the embodiments, clone tables 104-107 are created on different physical drives. A data processing engine selects clone tables 104-107 based on drive usage, while loading data in parallel to avoid I/O bottle necks.

With an aspect of the embodiments, a data processing engine enables server pool 102 to keep the resources available for a data movement in advance but also enables server pool 102 to dynamically add/remove resources using a computing cloud infrastructure (for example adding RAM, IO, HDD, new servers, and so forth).

With an aspect of the embodiments, copying data from a feed file is typically performed quicker than traditional approaches. Data from feed fie 102 is loaded in parallel in small data chunks via server pool 102 by using limited CPU, RAM, and network resources by each server in server pool 102. Any failure of data movement does not require substantial time to re-load the associated data chunk. This approach provides more transparency in the server utilization from the server pool 102 (for example, downstream dependent application servers may be utilized by respective an upstream application for processing). Also data compression may save the memory space on servers in pool 102.

With an aspect of the embodiments, data is not saved on the servers in pool 102 except for the master/primary server. This approach provides a greater degree of security.

With another aspect of the embodiments, if any data chunk fails to properly load, a data processing engine requests for a corrective data chunk from a stakeholder and reloads the data chuck upon arrival. The data chunk may be reloaded through different server if there is any server issues.

Figure 2:
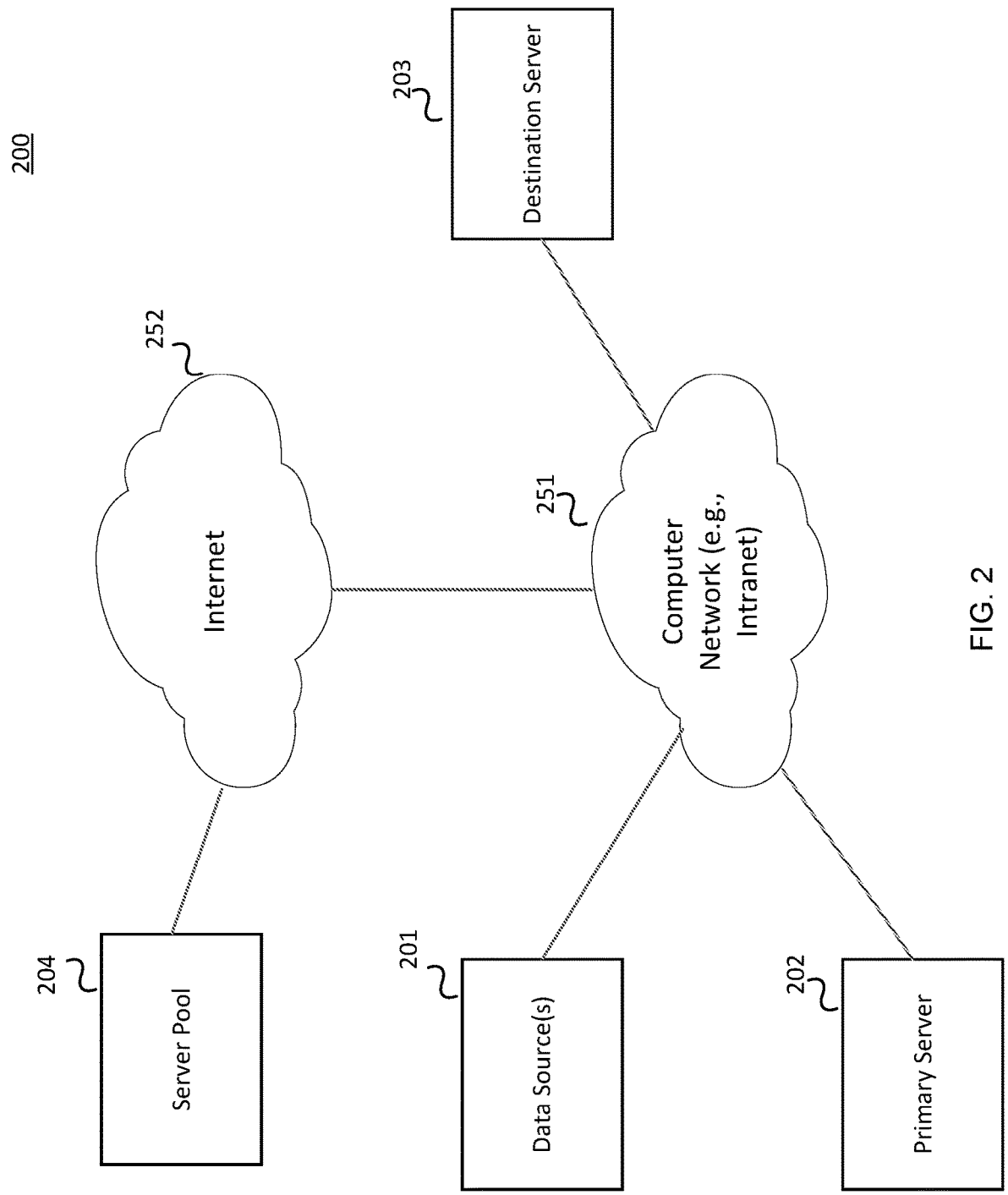
FIG. 2 illustrates a data system in accordance with one or more example embodiments.

FIG. 2 illustrates data system 200 in accordance with one or more example embodiments. With an aspect of the embodiment, data system 200 comprises data source 201, primary server 202, destination server 203, server pool 204, and networks 251-252.

One or more feed files are obtained from data source 201, loaded into clone tables at destination server 203, and switched (copied) into a destination data structure (for example, database file) at destination server 203. Data source 201 may be available from one or more computing devices not explicitly shown in FIG. 2.

With an aspect of the embodiments, a feed file may assume different forms, for example a structured query language (SQL) organized as a collection of rows, where each row has a plurality of columns. However, embodiments may support other types of feed files having a collection of tuples and so forth.

While primary server 202 is depicted as being supported on network 251, with some embodiments, primary server 202 may be supported by one of the servers in server pool 204 through network 252.

Figure 5:
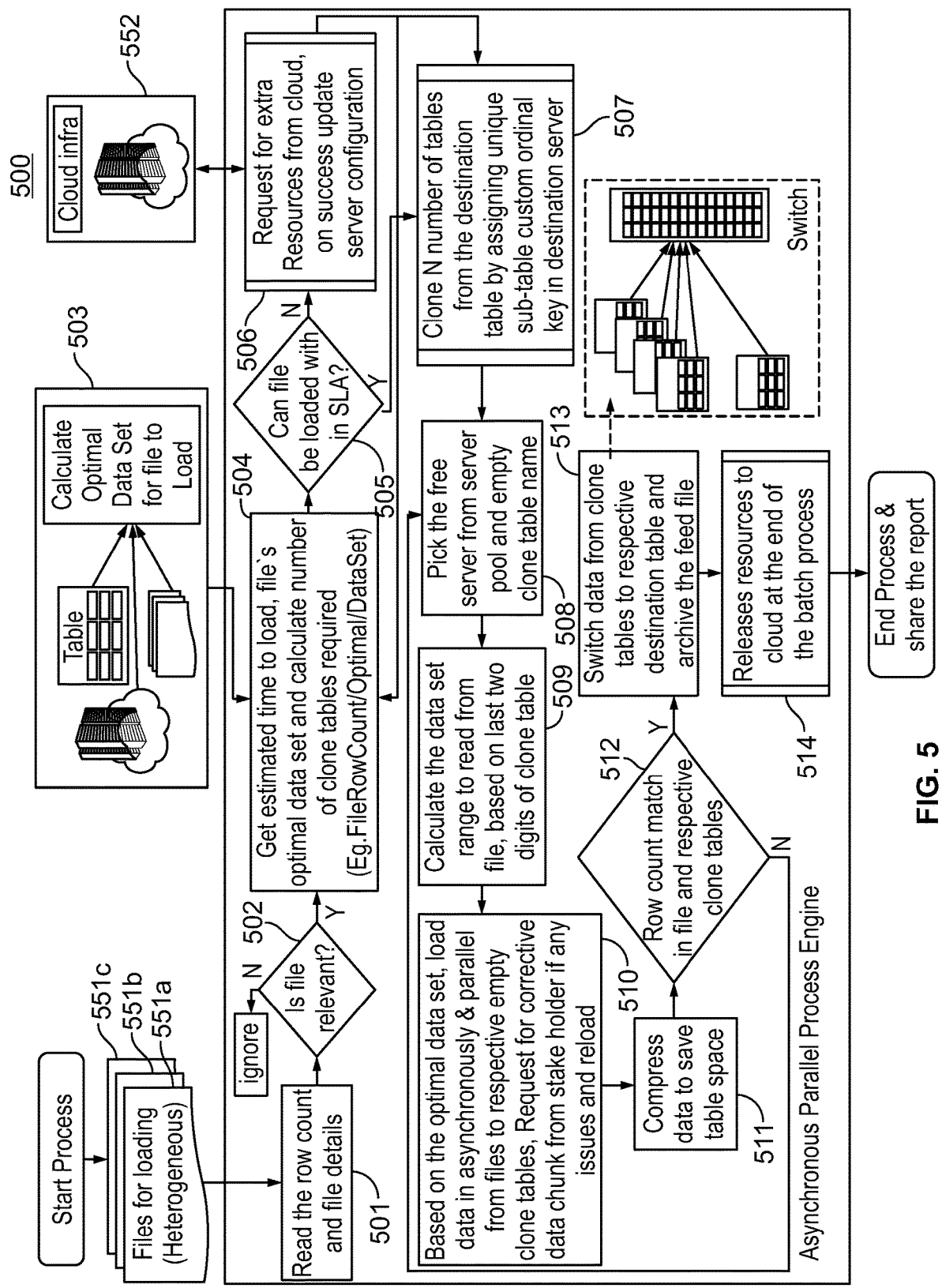
FIG. 5 illustrates an asynchronous parallel process engine according to one or more illustrative embodiments.

With an aspect of the embodiments, a data processing engine (for example, executing process 500 as shown in FIG. 5) may be implemented on primary server 202.

With an aspect of the embodiments, a data processing engine may request for an amount of computing resources (for example, a number of servers in server pool 204) based on an amount of data to be loaded from data source 201 and the desired time to perform the loading.

Figure 3:
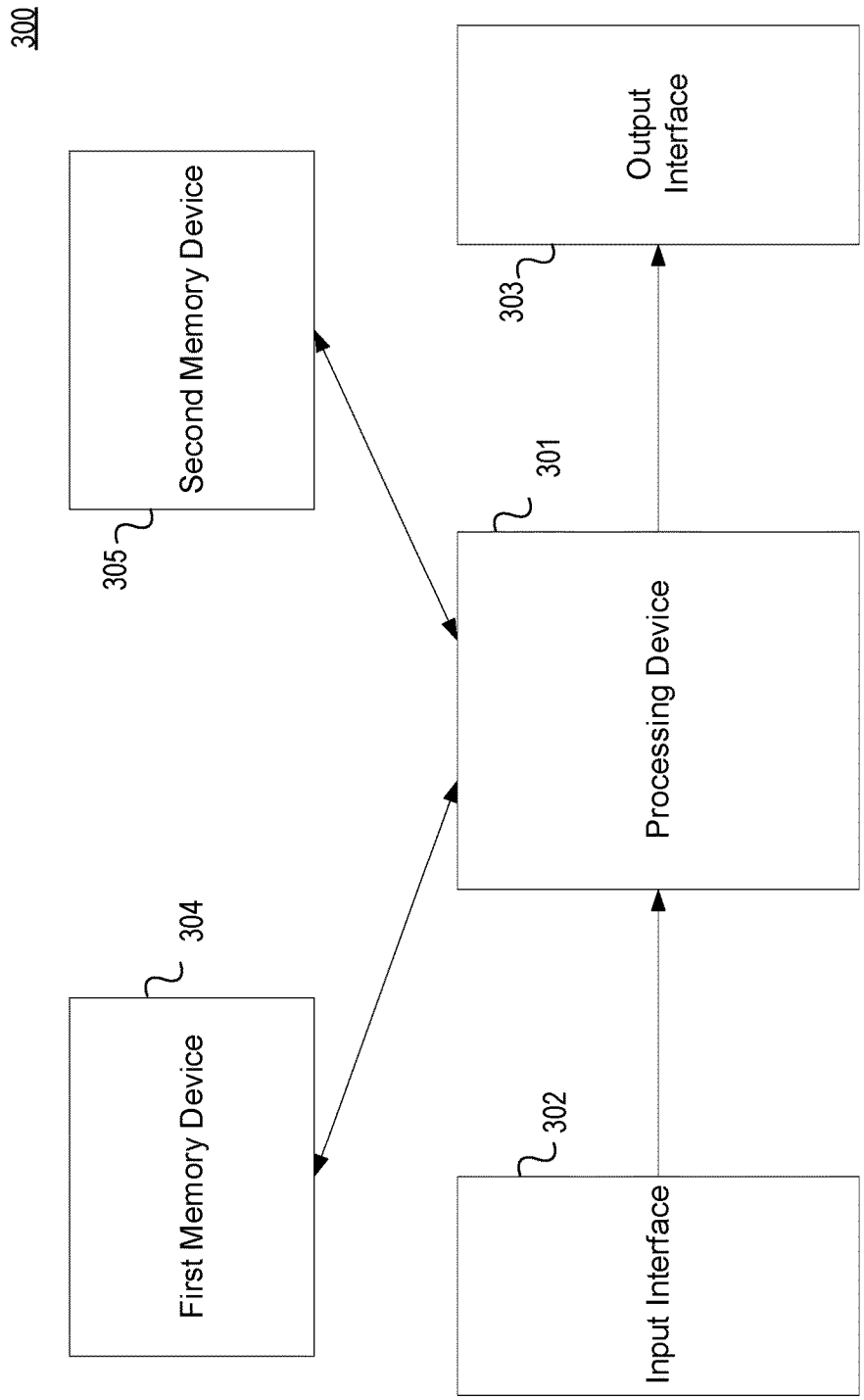
FIG. 3 illustrates an example of a suitable computing system environment for supporting one or more servers shown in FIG. 2 according to one or more illustrative embodiments.

FIG. 3 illustrates an example of a suitable computing system environment for supporting one or more servers 202-204 shown in FIG. 2 according to one or more illustrative embodiments.

Computing device 301 may have a processor for controlling overall operation of the computing device 301 and its associated components, including memory devices 304 and 305, input interface 302, and output interface 303.

Computing device 301 typically includes a variety of computer readable media. Computer readable media may be any available media that may be accessed by computing device 301 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 301.

Although not shown, first memory device 304 may include one or more are applications representing the application data stored in first memory device 304 while computing device 301 is on and corresponding software applications (for example, software tasks), are running on the computing device 301. Second memory device 305 may support data structures for storing data (for example, clone tables 104-107 and/or destination table 108 as shown in FIG. 1).

Computer-executable instructions may be stored within first memory device 304 and/or storage to provide instructions to a processor for enabling computing device 301 to perform various functions. For example, memory device 304 may store computer-executable used by the computing device 301, such as an operating system, application programs, and an associated database. Alternatively, some or all of the computer executable instructions for computing device 301 may be embodied in hardware or firmware (not shown).

Embodiments of the invention may include forms of computer-readable media. Computer-readable media include any available media that can be accessed by a computing device 301. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

First memory device 304 may include one or more program modules having instructions that when executed by computing device 301 cause servers 201, 202 and 204 to perform one or more functions described herein.

Although not required, various aspects described herein may be embodied as a method, a data processing system, or as a computer-readable medium storing computer-executable instructions. For example, a computer-readable medium storing instructions to cause a processor to perform steps (blocks) of a method in accordance with aspects of the invention is contemplated. For example, aspects of the method steps disclosed herein may be executed on a processor on computing device 301. Such a processor may execute computer-executable instructions stored on a computer-readable medium.

Computing device 301 may operate in a networked environment supporting connections to one or more remote computers, such as terminals. The terminals may be personal computers or servers that include any or all of the elements described above with respect to the computing device. The network connections include a local area network (LAN) and a wide area network (WAN), but may also include other networks. When used in a LAN networking environment, the computing device may be connected to the LAN through a network interface or adapter. When used in a WAN networking environment, the computing device may include a modem or other network interface for establishing communications over the WAN, such as the Internet. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device and/or terminals may also be mobile terminals (for example, mobile phones, smartphones, PDAs, notebooks, tablets, and the like) including various other components, such as a battery, speaker, and antennas (not shown).

The disclosure is operational with numerous types of general purpose or special purpose computing devices. Examples of well-known computing devices that may be suitable for use with the disclosure include, but are not limited to, personal computers, server computers, hand-held or laptop devices, multiprocessor systems, microprocessorbased systems, set top boxes, programmable consumer electronics, network PCs, minicomputers, mainframe computers, distributed computing environments that include any of the above systems or devices, and the like.

Another illustrative system for implementing methods according to the present disclosure may be used. The system may include one or more workstations. The workstations may be used by, for example, agents or other employees of an institution (for example, a financial institution) and/or customers of the institution. Workstations may be local or remote, and are connected by one or more communications links to computer network that is linked via communications links to the server. In the system, the server may be any suitable server, processor, computer, or data processing device, or combination of the same.

A computer network may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. The communications links may be any communications links suitable for communicating between the workstations and the server, such as network links, dial-up links, wireless links, hard-wired links, and the like.

Referring to FIG. 2, with some embodiments primary server 202 may comprise processing device 301, memory device 304, input interface 302, and output interface 303. Processing device 301 may execute computer-readable instructions stored at memory device 304 in order to execute process 500 as shown in FIG. 5 and will discussed in further detail. Processing device 301 may receive file information (for example, row/byte count and file details) about one or more heterogeneous files that are to be stored at one or more data structures (for example, one or more databases) at destination server 203. Based on resource parameters determined by process 500, processing device 301 may request for resources (for example, servers in a server pool) from a computing cloud through output interface 303.

With some embodiments, one or more pool server(s) 204 comprises processing device 301, memory device 305, input interface 302, and output interface 303. Processing device 301 receives assigned data (data chunks) from data source 301 through input interface 302 and loads the data into a designated data structure (for example, table 108 as shown in FIG. 1) through output interface 303. While the data chucks may be temporarily stored in memory device 305, the data chucks may be saved only at destination server 203. This approach provides a greater degree of security.

With some embodiments, destination server 203 comprises processing device 301, input interface 302, and memory device 305. Data chucks are loaded into a data structure supported by memory device 305 through input interface 305.

Figure 4:
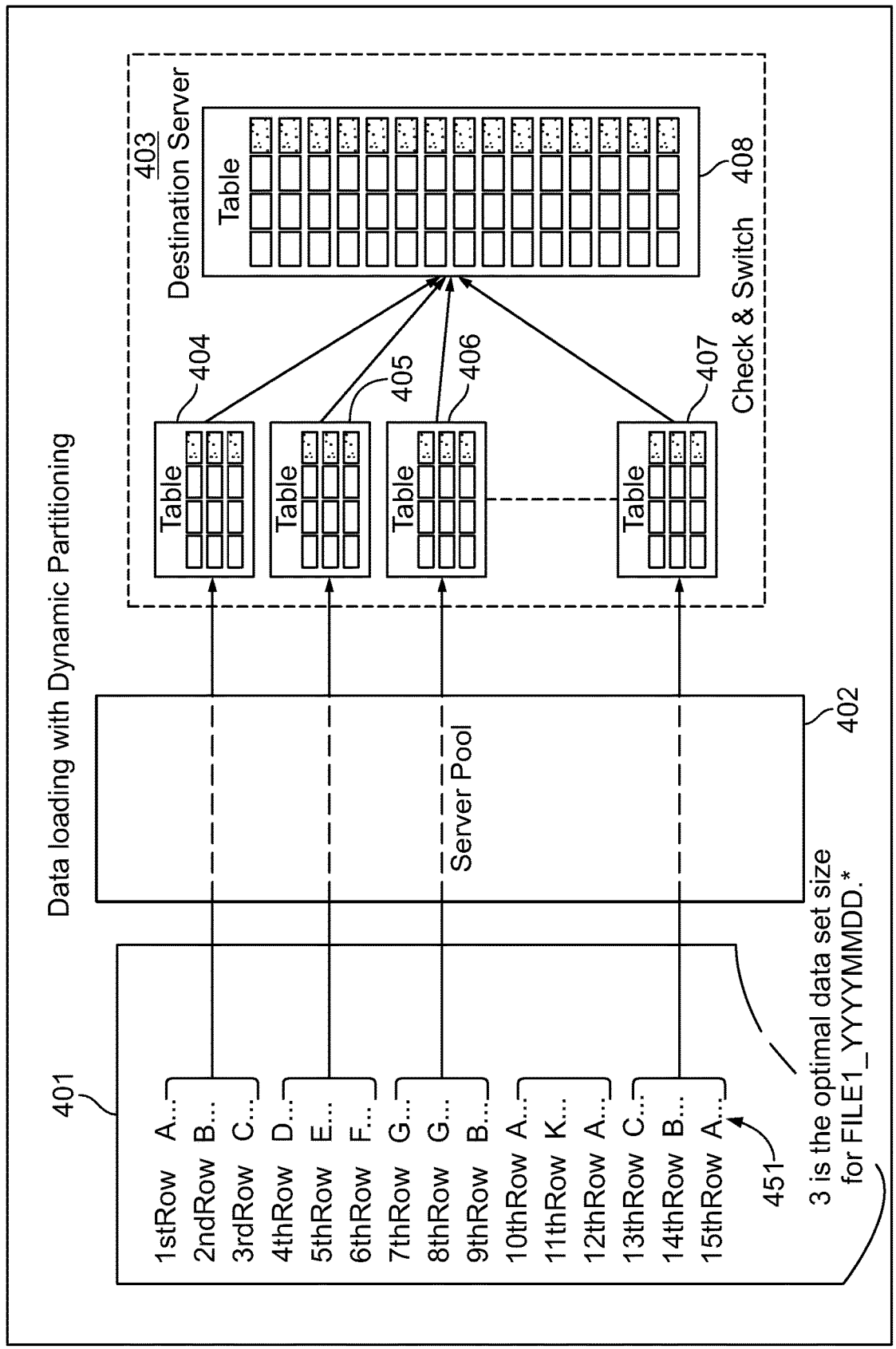
FIG. 4 illustrates dynamically partitioning data into clone tables in accordance with one or more example embodiments.

FIG. 4 illustrates dynamically partitioning data into clone tables in accordance with one or more example embodiments. Table partitioning is a way to divide a large table into smaller, more manageable parts without having to create separate tables for each part. Data in a partitioned table may be physically stored in groups of contiguous rows called partitions and each partition can be accessed and maintained separately.

In accordance with traditional approaches, data in a partitioned table may be partitioned based on a single column 451, which may referred as a static partition key. As depicted in FIG. 4, different values of the static partition key are dispersed throughout table 401. With traditional approaches, data may be split by the value of the static partition key. For example, rows 1, 10, 12, and 15 have a static partition key value of "A" and are loaded into one table. Rows having a static partition key value of "B" are loaded into a different table and so forth. However, contiguous row entries in table 402 do not typically have the same value, thus making it difficult to split the data in data chucks in a parallel manner.

With an aspect of the embodiments, data in table 401 may be partitioned into a plurality of data chucks according to a dynamic partitioning key, where each data chuck comprises a determined number of contiguous rows. The dynamic partitioning key is not dependent on the content of the columns in the rows. For example, if the row size if determined to be 3 rows, rows 1-3, 4-6, 7-9, 10-12, and 13-15 are portioned into data chucks 1, 2, 3, and 5 and are stored in tables 404-407, respectively, at destination server 403 via server pool 402. (In practical situations, since the source (feed) file typically has a large number of rows, the row size is often substantially larger than three.) The loading of tables 404-407 are performed in an asynchronous manner so that any of the tables may be completed before the other tables. Order of completion may vary from instance to instance due to changing performance conditions.

Each data chuck may be identified by a dynamic partitioning key (dynamic table key). With some embodiments, the dynamic partitioning key may be reflected in the table's numerical suffice. As shown in FIG. 4, tables 404, 405, 406, and 407 store the first, second, third, and fifth partition, respectively. Consequently tables 404, 405, 406, and 407 are identified as table_01, table_02, table_03, and table_05, respectively.

With an aspect of the embodiments, the partitioning of a feed file may be performed in a dynamic manner based on the performance of the servers in the server pool and the desired time to load the feed file into the destination table. The size of a data chunk (partition) may be adjusted accordingly.

While FIG. 4 depicts the row size as being the same for all data chucks, embodiments may support data chucks having unequal row sizes. Since different servers in server pool 402 are associated with different data chunks and have different performance capabilities, the corresponding row size may vary.

With an aspect of the embodiments, a data processing engine (for example, executing process 500 as shown in FIG. 5) determines an appropriate row size of each data chunk corresponding to tables 404-407 based on dynamic partitioning. The size may vary based on the performance of the servers in server pool 402.

In general, $M_i$ contiguous rows are loaded in the $i^{th}$ clone table, where $M_i$ is the size of the $i^{th}$ clone table and the first row is the next row after the last row in the $(i-1)^{th}$ clone table. However, embodiments support configurations in which the sizes of all clone tables are the same.

Once all of the tables 404-407 are loaded, the data is transferred (switched) to table 408 in an order based on the dynamic partitioning key.

While FIG. 4 depicts only one feed file 401, a plurality of feed files may be supported concurrently. For example, server pool 402 may load different sets of clone tables from different feed files in a parallel manner. This aspect is discussed in more detail with FIGS. 6 and 7A-B.

FIG. 5 illustrates process 500 executed by an asynchronous parallel process engine (which may be referred to as a data processing engine) according to one or more illustrative embodiments. Referring to FIG. 2, process 500 may execute on primary server 202, which may, for example, be one of the servers (not explicitly shown) in pool 202 residing in the cloud or may be a server connected to an intranet such as network 251.

Process 500 is advantageous to traditional approaches. With one exemplary scenario, a feed file size is 500 GB and is processed by 6 servers with each server having 128 GB of RAM and 16 cores. With a traditional approach (without using dynamic partitioning keys), the time to load to a destination table is approximately 20 hours (where the worst case scenario is 48 hours). With embodiments using dynamic partitioning keys, the time to load to a destination table is approximately 2 hours (where the worst case scenario is 5 hours). This example suggests a significant improvement with respect to traditional approaches.

Process 500 obtains data from one or more feed files 551a-c, which may be heterogeneous. If there are a plurality of feed files, the data processing engine may concurrently (in parallel) process the data for the feed files. Consequently, the following discussion of process 500 is directed only to one feed file 551a.

At block 501, process 500 obtains characteristics (for example, the number rows and file details) about feed file 551a. At block 502, process 500 determines whether file 551a is relevant to the expected feed file. If so, process 500 advances to block 503.

At block 503, process 500 determines an optimal number of rows to load in each of the clone tables based on historical information about previous feed files. Subsequently, process 500 loads data partitions (data chucks) into the clone tables in parallel. Block 503 may recalibrate the optimal number of rows when the changes are made to the feed file columns or any resources (software/hardware). Process 500, at block 503, may use a linear regression statistics on historical file load times for each feed file to compute an optimal data set. The dataset may be characterized by the number of rows, size in MB/GB, file types and so forth. When determining the optimal data set, process 500 may consider file type, file size, server capacity (for example, RAM, CPU clock speed, cores, disk type, and so forth), and network capacity.

At block 504, process 500 determines the number of clone tables (N) that are needed to move the data from 551a feed file to the destination table. Process 500 may determine the number (N) from dividing the number of rows (R) in file 551a by the optimal row size (M) in an optimal dataset. For example, if R=100 and M=10, then N=10. In other words, 10 clone tables would be needed. (In a practical situation, R and M may be much larger.) As will be discussed, optimal datasets (data chunks) are loaded into each clone table. Subsequently, data in the clone tables are switched into the destination table.

Based on an estimated time to load the data as determined at block 504, process 500 at block 505 determines whether feed file 551a can be loaded in a time specified by a service level agreement (SLA). If not, process 500 may request for additional resources (for example, servers) from a computing cloud at block 506. For example, each server in a server pool may be assigned a clone table.

There is a pool of servers (for example, pool 102 as shown in FIG. 1) that is tasked with reading the data from feed file and copying them into the destination server (for example, server 103 as shown in FIG. 1). The workload of the server pool may be managed by one of the servers in the pool acting as the master/primary server.

At blocks 507-510, process 500 configures the determined number (N) of clone tables at the destination server, where each clone table is assigned a dynamic partitioning key (sub-table ordinal key) and where each clone table may be supported by different physical drives. The dynamic partitioning key maps a set of congruous rows to each clone table in an ordered fashion. With some embodiments, the dynamic partitioning key may be reflected in a numerical attachment (for example, a numerical suffix) attached to clone table name (for example, CloneTable_01, CloneTable_02, CloneTable_03, . . . CloneTable_N), where the numerical suffix is indicative of the partitioning order.

Process 500 selects an available server from the server pool and assigns it the task of reading an optimal row chunk (M) and loads the data chunk into the assigned empty clone table via its assigned physical drive. (The clone tables are concurrently loaded (in parallel) via the assigned physical drives.) The range of rows that are loaded into each clone table may be determined from the clone table's last two digits (numerical suffix). For example, extending the above example where R=100, M=10, and N=10, contiguous rows 1-10 are loaded into CloneTable_01, contiguous rows 11-20 are loaded into CloneTable_02, and so forth until all rows (R) are loaded into their corresponding clone tables from feed file 551a.

If any of the data chunk fails to load into a clone table due to data issues, process 500 may request the respective stake holders for the corrective data and may reload the data chunk after receiving the corrective data. Also, process 500 may reload the data chunk with another server if there are server issues.

The loaded data may be compressed at block 511 to save table space.

After matching the number of rows between feed file 551a and corresponding clone tables at block 512, loaded data in the clone tables may be switched/moved to the destination table at block 513. Ad-Hoc resources may be released to the computing cloud upon process completion at block 514.

Figure 6:
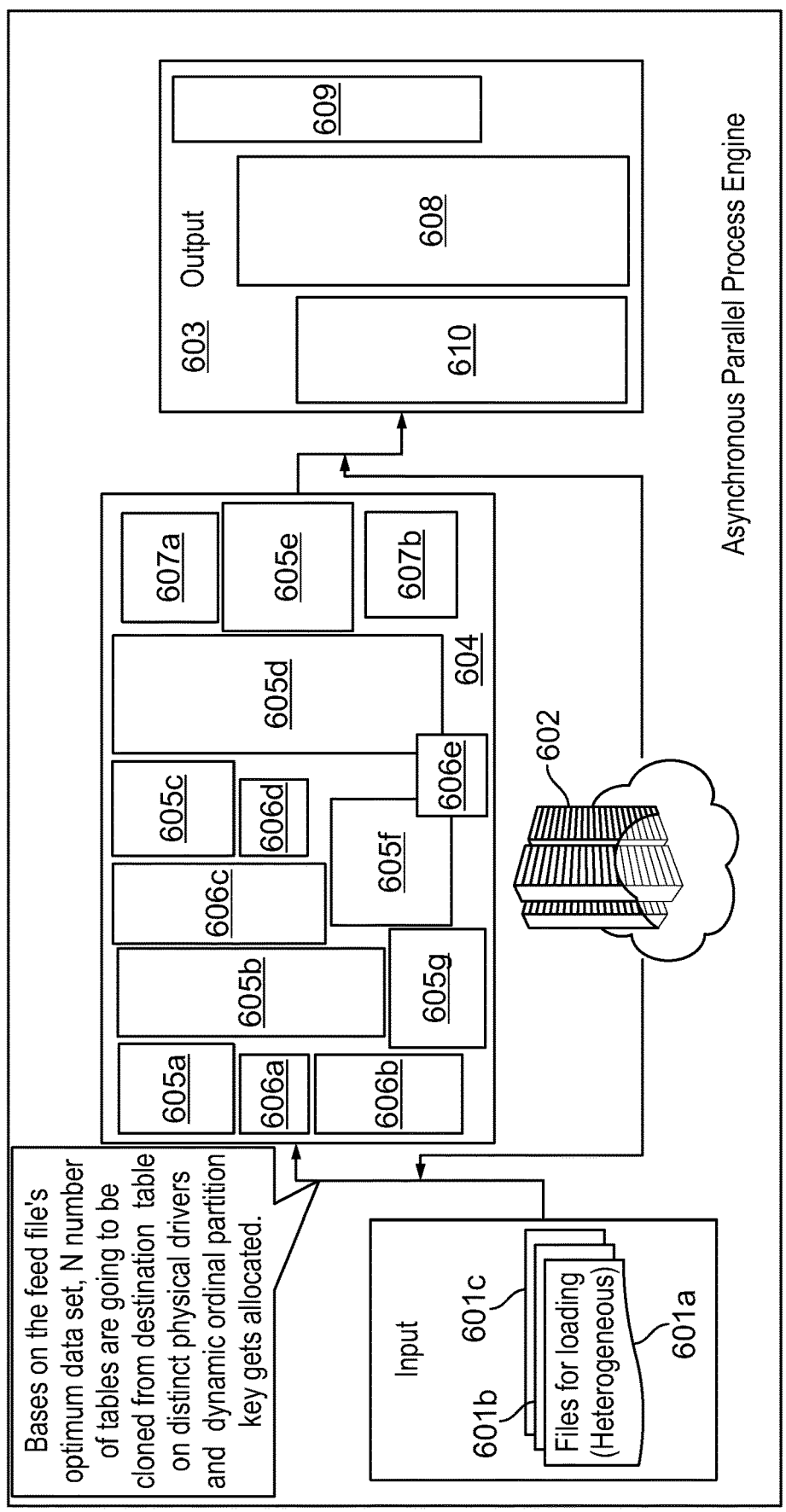
FIG. 6 illustrates partitioning feed files into clone tables and subsequently stored into destination files according to one or more illustrative embodiments.

FIG. 6 illustrates partitioning feed files 601a, 601b, and 601c into clone tables 605a-f, 606a-e, and 607a-b, respectively, at destination server 604 and subsequently storing the load data into destination files 608, 609, and 610, respectively, according to one or more illustrative embodiments.

A plurality of servers in pool 602 are configured to load data from feed files 601a, 601b, and 601c into an assigned set of clone tables. FIG. 6 depicts an example, where $N_a$, $N_b$, and $N_c$ (the number of clone tables in each set) corresponds to 601a, 601b, and 601c, respectively, and may be different in value.

With an aspect of the embodiments, feed files 601a, 601b, and 601c are concurrently processed (in parallel), where some or all of the servers in pool 602 participate in loading data from a feed file into a corresponding set of clone tables.

While the example shown in FIG. 6 shows different destination files for each of the feed files, some embodiments may switch to loaded data into a common destination file.

Figure 7A:
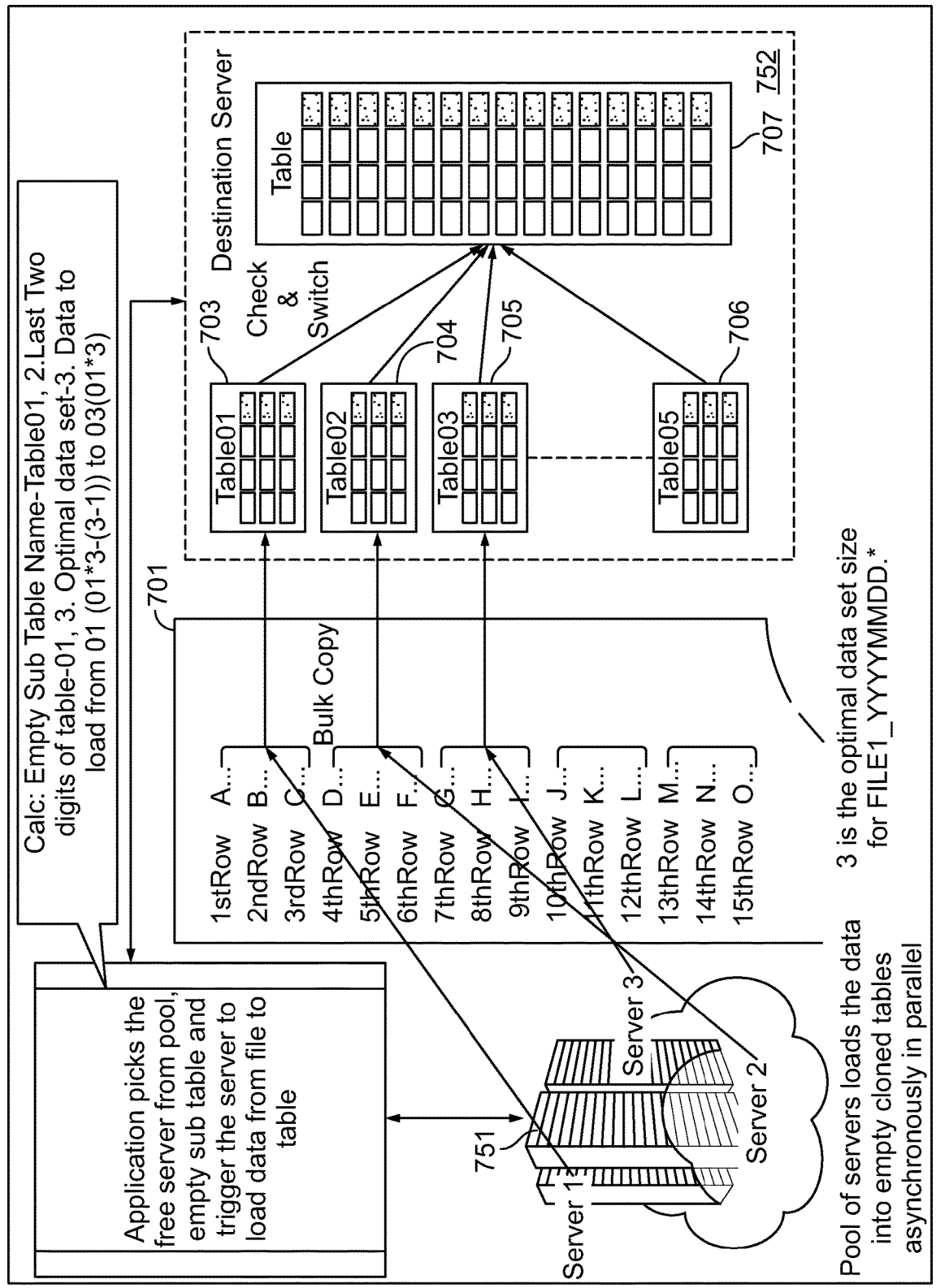
FIG. 7A and FIG. 7B illustrate asynchronously processing a plurality of feed files in accordance with one or more example embodiments.
Figure 7B:
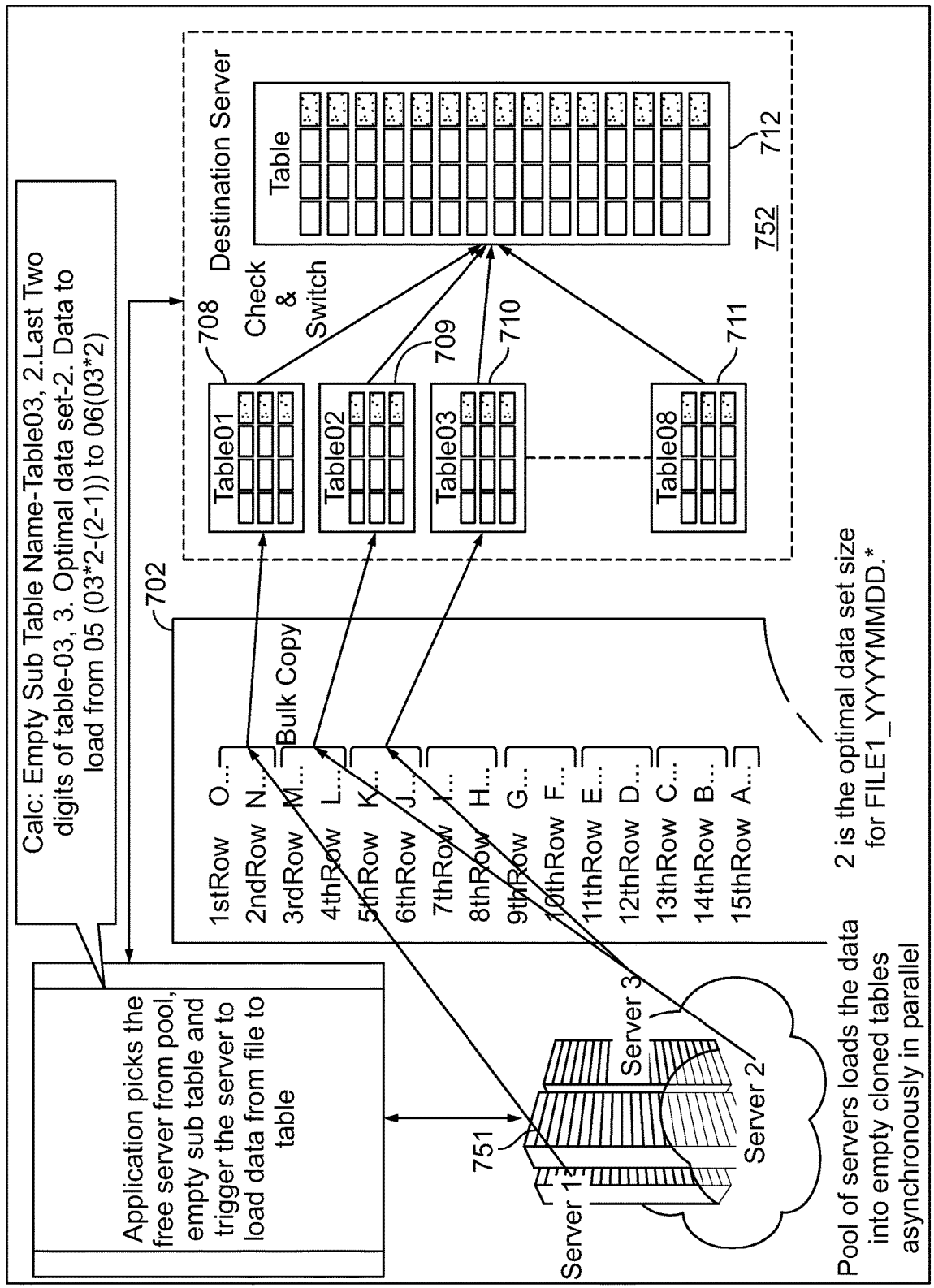

FIGS. 7A-B illustrate asynchronously processing a plurality of feed files in accordance with one or more example embodiments. FIGS. 7A and 7B depict feed file 701 and feed file 702, respectively being concurrently loaded into destination files 707 and 712, respectively, via clone tables 703-706 and 708-711, respectively. One or more servers in pool 751 are tasked to load data from feed files 701-702 into clone tables 703-706 and 708-711.

The optimal row size may be different for different feed files. For example, the optimal row size is three for feed file 701 as shown in FIG. 7A while the optimal row size is two for feed file 702 as shown in FIG. 7B.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (for example, air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. One or more non-transitory computer-readable media storing computer-readable instructions that, when executed by a computer system, cause the computer system to:
   receive a first row/byte count of a first feed file;
   determine a first optimal size ($M_1$) from a first optimal dataset and a first number ($N_1$) of clone tables based on the first optimal size and the first row/byte count of the first feed file;
   configure a first set of $N_1$ clone tables at a destination server, wherein each clone table corresponds to a subset of contiguous rows of the first feed file, wherein the first set of $N_1$ clone tables spans all of the rows of the first feed file, and wherein the first set of $N_1$ clone tables include a first clone table and a second clone table;
   assign one of a plurality of unique dynamic partitioning keys to each of the $N_1$ clone tables;
   load, through a server pool, asynchronously and in parallel, a first subset of $M_1$ contiguous rows into the first clone table and a second subset of $M_1$ contiguous rows into the second clone table, respectively; and
   when all of the $N_1$ clone tables are loaded, switch the loaded data in the $N_1$ clone tables into a first destination table in an order based on the plurality of unique dynamic partitioning keys.

2. The one or more non-transitory computer-readable media of claim 1 wherein the $N_1$ clone tables include third and four clone tables and storing computer-readable instructions that, when executed by the computer system cause the computer system to:
   determine a second optimal size ($M_2$) for a second optimal dataset, wherein the first optimal size and the second optimal size are different and wherein the first number ($N_1$) of clone tables is further based on the second optimal size; and
   load, through the server pool, asynchronously and in parallel, a third subset of $M_2$ contiguous rows into the third clone table and a fourth subset of $M_2$ contiguous rows into the fourth clone table, respectively.

3. The one or more non-transitory computer-readable media of claim 1 storing computer-readable instructions that, when executed by the computer system cause the computer system to:
   receive a second row/byte count of a second feed file;
   determine a third optimal size ($M_3$) for a third optimal dataset and a second number ($N_2$) of clone tables based on the third optimal size and the second row/byte of the second feed file;
   configure a second set of $N_2$ clone tables at the destination server, wherein the second set includes a fifth table and a sixth clone table;
   load, through the server pool, asynchronously and in parallel, a fifth subset of $M_3$ contiguous rows and a sixth subset of $M_3$ contiguous rows into corresponding clone tables, wherein the loading is in parallel with loading the first and second clone tables; and
   when all of the $N_2$ clone tables are loaded, switch the loaded data in the $N_2$ clone tables into a second destination table.

4. The one or more non-transitory computer-readable media of claim 3, wherein the first feed file and the second feed file are heterogeneous.

5. The one or more non-transitory computer-readable media of claim 3, wherein the first destination table is identical to the second destination table.

6. The one or more non-transitory computer-readable media of claim 1 storing computer-readable instructions that, when executed by the computer system cause the computer system to:
   obtain an estimated time to load the first feed file into the first destination table;
   determine whether the loading is in accordance with a service level agreement (SLA);
   request computing resources from a computing cloud to satisfy the SLA; and
   configure the server pool based on the requested computing resources.

7. The one or more non-transitory computer-readable media of claim 6 storing computer-readable instructions that, when executed by the computer system cause the computer system to:
   when the SLA cannot be satisfied with the requested computing resources, request additional computing resources from the computing cloud.

8. The one or more non-transitory computer-readable media of claim 1 storing computer-readable instructions that, when executed by the computer system cause the computer system to:
   pick an empty clone table as the first clone table; and
   select a first server from the server pool to load the first clone table.

9. The one or more non-transitory computer-readable media of claim 1 storing computer-readable instructions that, when executed by the computer system cause the computer system to:

name each said of the $N_1$ clone tables to have a numerical attachment based on the plurality of unique dynamic partitioning keys.

10. The one or more non-transitory computer-readable media of claim 9 storing computer-readable instructions that, when executed by the computer system cause the computer system to:

obtain a dataset range of each said of the $N_1$ clone tables from the numerical attachment.

11. The one or more non-transitory computer-readable media of claim 1 storing computer-readable instructions that, when executed by the computer system cause the computer system to:

when an error occurs when loading the first clone table, request for corrective data; and reload the corrective data into the first clone table.

12. The one or more non-transitory computer-readable media of claim 11 storing computer-readable instructions that, when executed by the computer system cause the computer system to:

reload the corrective data through another server in the server pool.

13. The one or more non-transitory computer-readable media of claim 1 storing computer-readable instructions that, when executed by the computer system cause the computer system to:

compress loaded data in the first set of $N_1$ clone tables.

14. A method for splitting data and storing the data, the method comprising:

receiving a first row/byte count of a first feed file;

determining a first optimal size ($M_1$) from a first optimal dataset and a first number ($N_1$) of clone tables based on the first optimal size and the first row/byte count of the first feed file;

configuring a first set of $N_1$ clone tables at a destination server, wherein each clone table corresponds to a subset of contiguous rows of the first feed file, wherein the first set of $N_1$ clone tables spans all of the rows of the first feed file, and wherein the first set of $N_1$ clone tables include a first clone table and a second clone table;

assigning dynamic partitioning keys to the $N_1$ clone tables;

loading, through a server pool, asynchronously and in parallel, a first subset of $M_1$ contiguous rows into the first clone table and a second subset of $M_1$ contiguous rows into the second clone table, respectively; and when all of the $N_1$ clone tables are loaded, switching the loaded data in the $N_1$ clone tables into a first destination table in an order based on the dynamic partitioning keys.

15. The method of claim 14, wherein the N clone tables include third and four clone tables, the method further comprising:

determining a second optimal size ($M_2$) for a second optimal dataset, wherein the first optimal size and the second optimal size are different and wherein the first number ($N_1$) of clone tables is further based on the second optimal size; and loading, through the server pool, asynchronously and in parallel, a third subset of $M_2$ contiguous rows into the third clone table and a fourth subset of $M_2$ contiguous rows into the fourth clone table, respectively.

16. The method of claim 14, further comprising:

receiving a second row/byte count of a second feed file;

determining a third optimal size ($M_3$) for a third optimal dataset and a second number ($N_2$) of clone tables based on the third optimal size and the second row/byte of the second feed file;

configuring a second set of $N_2$ clone tables at the destination server, wherein the second set includes a fifth table and a sixth clone table;

loading, through the server pool, asynchronously and in parallel, a fifth subset of $M_3$ contiguous rows and a sixth subset of $M_3$ contiguous rows into corresponding clone tables, wherein the loading is in parallel with loading the first and second clone tables; and when all of the $N_2$ clone tables are loaded, switching the loaded data in the $N_2$ clone tables into a second destination table.

17. The method of claim 14, further comprising:

obtaining an estimated time to load the first feed file into the first destination table;

determining whether the loading is in accordance with a service level agreement (SLA);

requesting computing resources from a computing cloud to satisfy the SLA; and configuring the server pool based on the requested computing resources.

18. The method of claim 14, further comprising:

when an error occurs when loading the first clone table, requesting for corrective data; and reloading the corrective data into the first clone table.

19. A data processing computing device, comprising:

an input interface;

an output interface;

a processor; and at least one memory device storing computer-executable instructions that, when executed by the processor, cause the data processing computing device to:

receive, through the input interface, a first row/byte count of a first feed file;

determine a first optimal size ($M_1$) for a first optimal dataset and a first number ($N_1$) of clone tables from the first optimal size and the first row/byte count of the first feed file;

configure, through the output interface, a first set of $N_1$ clone tables at a destination server, wherein each clone table corresponds to a subset of contiguous rows of the first feed file, wherein the first set of $N_1$ clone tables spans all of the rows of the first feed file, and wherein the first set of $N_1$ clone tables include a first clone table and a second clone table;

assign a first plurality of dynamic partitioning keys to the $N_1$ clone tables;

instruct, a server pool through the output interface, to load asynchronously and in parallel a first subset of $M_1$ contiguous rows into the first clone table and a second subset of $M_1$ contiguous rows into the second clone table, respectively; and when all of the $N_1$ clone tables are loaded, instruct the destination server to switch the loaded data in the $N_1$ clone tables into a first destination table in an order based on the first plurality of dynamic partitioning keys.

20. The data processing computing device of claim 19, wherein the at least one memory device stores computer-executable instructions that, when executed by the processor, cause the data processing computing device to:

receive, through the input interface, a second row/byte count of a second feed file;

determine a second optimal size ($M_2$) for a second optimal dataset and a second number ($N_2$) of clone tables from the second optimal size and the second row/byte count of the second feed file;

configure, through the output interface, a second set of $N_2$ clone tables at the destination server, wherein the second set of $N_2$ clone tables is distinct from the first set of $N_1$ clone tables;

assign a second plurality of dynamic partitioning keys to the $N_2$ clone tables;

instruct, the server pool through the output interface, to load asynchronously and in parallel a first subset of $M_3$ contiguous rows and a second subset of $M_3$ contiguous rows into corresponding clone tables, wherein the loading is in parallel with loading the first and second clone tables; and when all of the $N_2$ clone tables are loaded, instruct the destination server to switch the loaded data in the $N_2$ clone tables into a second destination table.

\* \* \* \* \*